United States Patent [19]

Shibuya et al.

[11] Patent Number: 5,346,758
[45] Date of Patent: Sep. 13, 1994

[54] MAGNETIC COATING COMPOSITION AND MAGNETIC RECORDING MEDIUM

[75] Inventors: Yoshiyuki Shibuya; Shigeo Daimon, both of Osaka; Kazuo Okamura, Hyogo, all of Japan

[73] Assignee: Daikin Industries, Ltd., Osaka, Japan

[21] Appl. No.: 935,083

[22] Filed: Nov. 24, 1986

Related U.S. Application Data

[63] Continuation of Ser. No. 703,949, Feb. 21, 1985, abandoned.

[30] Foreign Application Priority Data

Mar. 1, 1984 [JP] Japan .................. 59-39941

[51] Int. Cl.$^5$ .............................................. G11B 5/00

[52] U.S. Cl. ...................... 428/328; 428/323; 428/329; 428/403; 428/408; 428/694 BA; 428/900; 423/439; 252/62.51; 252/62.55; 252/62.56

[58] Field of Search ............... 252/62.51, 62.55, 62.56; 423/439; 428/323, 328, 329, 403, 408, 694 BA, 900

[56] References Cited

U.S. PATENT DOCUMENTS

3,572,93  3/1971  Rogers ........................... 423/439
4,632,866 12/1986 Kubota et al. ................. 252/62.56

Primary Examiner—Stevan A. Resan
Attorney, Agent, or Firm—Nikaido, Marmelstein, Murray & Oram

[57] ABSTRACT

A magnetic coating composition comprising acicular particles containing iron carbide and a main magnetic material.

11 Claims, No Drawings

MAGNETIC COATING COMPOSITION AND MAGNETIC RECORDING MEDIUM

This application is a continuation of Ser. No. 703,949, filed Feb. 21, 1985, now abandoned.

The present invention relates to a magnetic coating composition and a magnetic recording medium.

Magnetic coating compositions generally comprise, in addition to a magnetic material, a binder, lubricant, abrasive such as alumina or silicon carbide, electroconductive material such as carbon or surfactant, colorant such as carbon black, etc. However, since these additives have no magnetization, such a magnetic coating composition has drawback of having reduced magnetic flux density and thus giving a magnetic record medium a reduced magnetic flux density.

Further, the magnetic coating composition prepared by admixing an additive having magnetization with the magnetic material is demanded for the additive to be so freely controllable in its coercive force, that the composition should not exhibit adversely affected play back, erasing and copying characteristics.

In view of the above drawback and demand, the present inventors have made research on additives which produce the effects of abrasion, electroconductivity and coloring and which also have a coercive force and a magnetization, and which is freely controllable in the coercive force.

An object of the invention is to provide a magnetic coating composition having incorporated therein an additive which is serviceable as an abrasive, electroconductive material, colorant, and which has a great coercive force and a high magnetization.

Another object of the present invention is to provide a magnetic coating composition having incorporated therein an additive which is freely controllable in its coercive force depending on the coercive force of the magnetic material.

The present invention provides a magnetic coating composition comprising acicular particles containing iron carbide and a magnetic material. Said magnetic material is hereinafter referred to as "a main magnetic material".

The present invention also provide a magnetic recording medium comprising a substrate coated with the above magnetic coating composition.

The acicular particles containing iron carbide, which serve as an additive according to the invention, are hard, high in electroconductivity, black — colored and have great coloring ability. Moreover, they can be prepared with a freely controlled coercive force.

Acicular particles having an appropriate coercive force can therefore be selected in accordance with the coercive force of the main magnetic material, in order to give the composition no adverse effects on the play back, erasing and copying characteristics.

The acicular particles containing iron carbide used in the present invention include particles disclosed in U.S. Pat. application Ser. No. 603,080 filed by the present applicant. The acicular particles are used preferably in an amount of about 0.5 to about 20% by weight, more preferably about 1 to about 10% by weight, based on the main magnetic material of the composition.

The acicular particles containing iron carbide are usually at least 3, preferably 3 to 20, in an average axial ratio (long axis/short or length/width) of primary particles and are usually up to 2 $\mu$m, preferably 0.1 to 2 $\mu$m, most preferably 0.1 to 1.0 $\mu$m, in average particle size (long axis or length).

The term "primary particles" herein used is referred to as particles which can be recognized as such when observed under an electron microscope (3000 to 6000X).

The iron carbide is one of $Fe_5C_2$, $Fe_2C$ and $Fe_{20}C_9$ ($Fe_{2.2}C$) or a mixture of at least two of these iron carbides. It is proper to formulate the iron carbide as $Fe_xC$ ($2 \leq x < 3$). Generally the presence of iron carbide in the particles can be detected by examining the X-ray diffraction pattern of the material with reference to the known X-ray diffraction patterns of the known iron carbides represented by chemical formulae (e.g. those on X-Ray Powder Data File of ASTM).

Preferably the acicular particles containing iron carbide are produced by a process in which acicular particles of iron oxyhydroxide or iron oxide are contacted with CO or with a mixture of CO and $H_2$.

The acicular particles containing iron carbide produced by tile preferable process are in tile form of generally uniform acicular particles when observed under an electron microscope. The particles are present as primary particles and have the almost same acicular particulate form as the starting particles of acicular iron oxyhydroxide or acicular iron oxide. The acicular particles obtained by the preferable process are found to contain elemental carbon by elementary analysis and to contain iron carbide by its X-ray diffraction pattern, which exhibits plane spacings (D-values) at 2.28Å, 2.20 Å, 2.08Å, 2.05Å and 1.92Å. Such pattern corresponds to $Fe_5C_2$. The iron carbide component mainly comprises $Fe_5C_2$, with $Fe_2C$, $Fe_{20}C_9$ ($Fe_{2.2}C$), $Fe_3C$, etc.

In the event of incomplete carbonization, the acicular particles obtained by the preferable process further contain an iron oxide component which is chiefly $Fe_3O_4$. With respect to iron oxides, FeO, $Fe_3O_4$ and $\gamma$-$Fe_2O_3$ are generally related to one another in structure. The oxygen atoms in these three oxides are packed in three-dimensional structure to the highest possible density, and the number of oxygen atoms in $Fe_3O_4$ actually present varies in an overall range covering the numbers of oxygen atoms in these oxides, so that it is proper to formulate the iron oxide in the acicular particles by $FeO_y$ ($1 < y \leq 1.5$).

While the acicular particles prepared by the preferable process contain iron oxide in addition to the iron carbide in most cases, the elementary analysis values of C, H and N indicate that the amount of carbon is usually excess of that calculated from the chemical formula of the iron carbide identified by the X-ray diffraction pattern. It is not clear whether the excess of carbon is present as combined with iron or as free carbon. I n this sense, it is probable that the acicular particles obtained by the preferable process contain elemental carbon. The particles obtained by the preferable process then include acicular particles at least 3 in average axial ratio with respect to their shape as primary particles and composed substantially of iron carbide alone or iron carbide and iron oxide and/or elemental carbon.

Magnetic materials used as the main magnetic material in the present composition include those already known, such as magnetic iron oxide, cobalt-modified iron oxide, chrominum dioxide and metallic iron.

The other components of the magnetic coating composition, such as binder resin, can be those already known as such. The magnetic coating composition can be prepared in a known method, for example, dispersing the magnetic materials in an organic solvent together with a binder. To the composition are added, as required, a dispersing agent, lubricant, abrasive, antistatic agent and like additives.

As binders can be used hitherto known thermoplastic resins, thermosetting resins, reactive resins, or mixtures thereof.

The magnetic coating composition is used for a magnetic recording medium, e.g. tape, disc or card. The magnetic recording medium is obtained by coating the magnetic coating composition on a substrate (support) and drying to form a magnetic layer. The magnetic recording medium of the invention has an excellent magnetic characteristics such as a high coercive force, magnetization, and is less susceptive to lapse of time.

The magnetic recording layers are formed by coating the magnetic coating composition on the support.

The thickness of the support used is conventional and is about 5 to 50 μm, preferably about 10 to 40 μm. The materials used for the support include polyesters such as polyethylene terephthalate and polyethylene-2,6-naphthalate, polyolefins such as polypropylene, cellulose derivatives such as cellulose triacetate and cellulose diacetate, polycarbonate, and the For preventing static discharge or preventing transfer printing, the above supports may have a back coat on the surface opposite the surface provided with the magnetic layer.

The supports may be in any shape such as a tape, sheet, card, disc or drum, and different materials can be used depending upon different shapes or end uses desired.

The magnetic coating composition can be applied on the support in various conventional methods including air doctor coating, blade coating, air knife coating, squeeze coating, impregnation coating, reverse roll coating, transfer roll coating, gravure coating, kiss coating, cast coating and spray coating. Other coating methods can also be used.

The magnetic layer formed on the support in the above method is dried after, if desired, the coating has been subjected to a treatment for orienting the acicular particles and the main magnetic material in the layer. If required, the magnetic layer can be subjected to a surface lubricating treatment, or cut to the desired shape, to thereby form a magnetic recording medium. In the above orienting treatment for the magnetic layer, the orienting magnetic field can be either an AC or DC magnetic field with a field strength of about 500 to 5,000 gauss. The drying temperature can range from about 50° to about 100° C., and the drying time is about 3 to 10 minutes.

The invention will be more apparent from the following examples.

REFERENCE EXAMPLE 1

A quantity (18.25g) of cobalt-modified iron oxide [0.4 μm in average particles size (length), 7 in average axial ratio, 650 Oe in Hc and 80emu/g in σs], 0.35g of α-alumina, 0.25g of carbon, 5.25g of vinyl chloride/vinyl acetate copolymer, 1.0g of dioctyl phthalate, 0.2g of laurie acid, 15.0g of toluene and 15.0g of methyl ethyl ketone were made into a magnetic coating composition, which was then applied to a polyethylene terephathalate film with a doctor knife (clearance: 100 μm) to obtain a magnetic record medium. The medium was 655 Oe in coercive force (Hc) and 1480 gauss in remanent flux density (Br).

EXAMPLE 1

A magnetic record medium was prepared in the same manner as in Reference Example 1 except that the total amounts of α-alumina and carbon were replaced by an equal amount of acicular particles [0.3 μm in average particle size (length), 8 in average axial ratio, 685 Oe in Hc and 100emu/g in σs ] containing iron carbide. The medium was 660 Oe in Hc and 1550 gauss in Br.

EXAMPLE 2

A magnetic record medium was prepared in the same manner as in Reference Example 1 except that t he total amounts of α-alumina and carbon were replaced by twofold amount of the same acicular particles containing iron carbide as used in Example 1. The medium was 669 Oe in Hc and 1870 gauss in Br.

EXAMPLE 3

A magnetic record medium was prepared in the same manner as in Reference Example 1 except that the total amounts of α-alumina and carbon were replaced threefold amount of the same acicular particles containing iron carbide as used in Example 1. The medium was 672 Oe in Hc and 1720 gauss in Br.

We claim:

1. A magnetic coating composition comprising a main magnetic material selected from the group consisting of magnetic iron oxide particles, cobalt-modified iron oxide particles, chromium dioxide particles and metallic iron particles, and acicular particles containing iron carbide produced by contacting acicular particles of iron oxyhydroxide or iron oxide with carbon monoxide or with a mixture of carbon monoxide and hydrogen, said acicular particles being up to 2 μm in average particles size (long axis or length) and having an average axial ratio of from about 3 to about 20 of primary particles.

2. A composition as defined in claim 1, wherein said acicular particles are contained in an amount of about 0.5 to about 20% by weight based on the weight of said main magnetic material.

3. A composition as defined in claim 1, wherein said acicular particles are contained in an amount of about 1 to about 10% by weight based on the weight of said main magnetic material.

4. A composition as defined in claim 1, wherein said acicular particles are 0.1 to 2.0 μm in average particles size.

5. A composition as defined in claim 4, wherein said average particle size is 0.1 to 1.0 μm.

6. A magnetic recording medium comprising a substrate coated with a magnetic coating composition as claimed in claim 1.

7. In a magnetic recording medium comprising a substrate coated with a magnetic coating composition having magnetic particles dispersed in a binder, the improvement wherein the magnetic powder is a mixture of (a) magnetic metal particles, and (b) magnetic iron carbide particles and/or magnetic particles containing iron oxide and iron carbide with the weigh ratio of (a) to (b) being in the range between 99.5:0.5 and 80:20.

8. The magnetic recording medium of claim 7, wherein the iron carbide has the formula $Fe_xC$ wherein x is a number of at least 2.

9. The magnetic recording medium of claims 7 or 8, wherein all of the magnetic iron carbide particles are acicular.

10. The magnetic recording medium of claim 7, wherein the magnetic particles are a mixture of (a) magnetic metal particles and (b) magnetic iron carbide particles.

11. The magnetic recording medium of claim 7, wherein the magnetic particles are a mixture of (a) magnetic metal particles and (b) magnetic particles containing iron oxide and iron carbide.

* * * * *

UNITED STATES PATENT AND TRADEMARK OFFICE
CERTIFICATE OF CORRECTION

PATENT NO. : 5,346,758
DATED : September 13, 1994
INVENTOR(S) : Yoshiyuki SHIBUYA et al It is certified that error appears in the above-indentified patent and that said Letters Patent is hereby corrected as shown below:

On the title page, item [63], change "21" to --20--.

Signed and Sealed this

Twenty-seventh Day of December, 1994

Attest:

BRUCE LEHMAN

Attesting Officer     Commissioner of Patents and Trademarks